July 8, 1958
R. T. WHITCOMB
2,841,951
APPARATUS FOR REDUCING EXHAUST GAS PRESSURE
IN INTERNAL COMBUSTION ENGINES
Filed Nov. 5, 1954
2 Sheets-Sheet 2
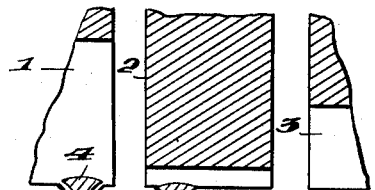
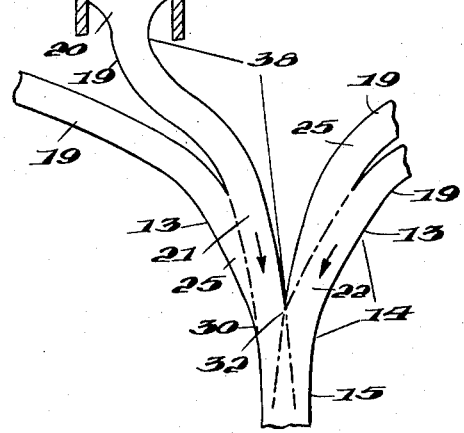
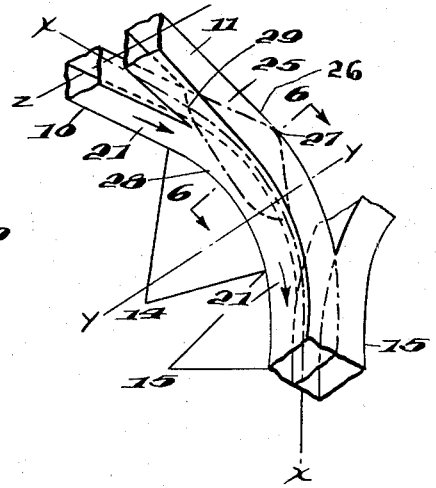
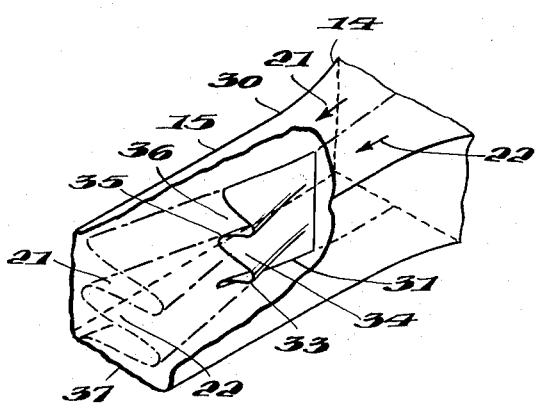
INVENTOR
Richard T. Whitcomb
BY
Pierce, Scheffler & Parker
ATTORNEYS

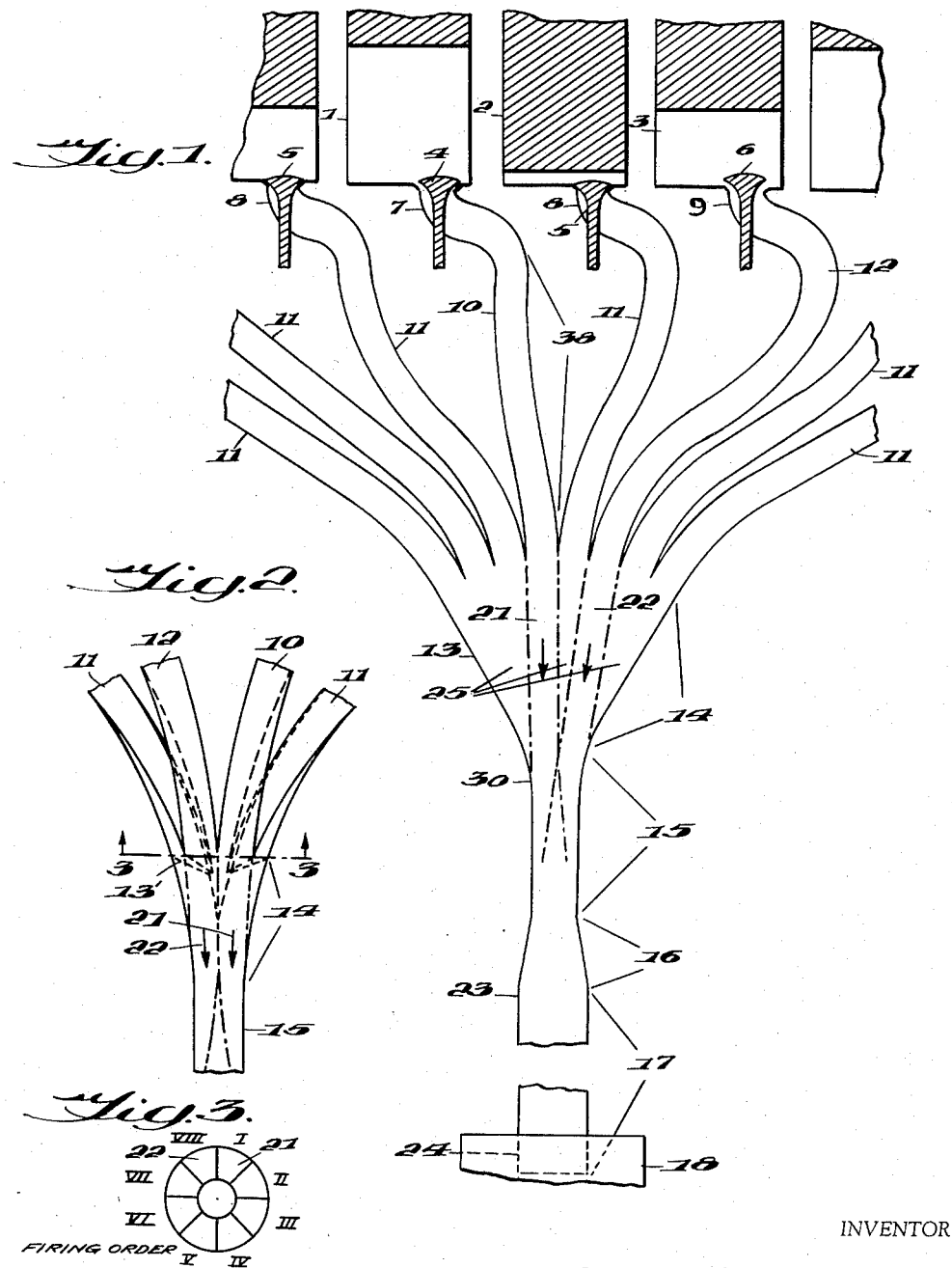

United States Patent Office

2,841,951
Patented July 8, 1958

2,841,951

APPARATUS FOR REDUCING EXHAUST GAS PRESSURE IN INTERNAL COMBUSTION ENGINES

Richard T. Whitcomb, Hampton, Va.

Application November 5, 1954, Serial No. 467,094

3 Claims. (Cl. 60—32)

This invention relates to modifications of the exhaust systems of multi-cylinder, four-cycle, internal combustion engines in order to utilize the potential gas energy available in the engine cylinders at the ends of the power strokes of the pistons to reduce the pressure in the cylinders during and at the end of the exhaust strokes of the pistons, thereby increasing the torque output of the engine. To eliminate the need for mechanical moving parts operating in the extremely hot exhaust gases the functioning of the invention is entirely gas dynamic in nature.

Such a reduction in exhaust gas pressure in a four-cycle engine may be accomplished by a system, as disclosed in British Patent No. 363,382 for a two cycle engine, wherein exhaust ducts from the various exhaust ports of the engine cylinders are united at a common region in an effectively parallel direction and an ejector, of well known action, is connected to the region of union. The flow of high-energy exhaust gas through the ejector, following the opening of an exhaust valve, results in reductions in the pressures in the several ducts. This leads to an increase in the rate of flow from the cylinders with open exhaust valves and reductions in the pressures therein. However in the system disclosed in the aforesaid British patent with the ebb of high energy flow through the ejector the available energy is generally insufficient to maintain a forward flow across the entire ejector against the pressure differential as produced by the high energy flow, and part, or all, of the flow therein reverses. This flow reversal generally causes significant dissipation of the energy of the exhaust gas. This dissipation results in a decrease of the energy available for the basic action of the apparatus which, of course, results in a reduction in the possible effectiveness of this action. It is a primary object of this invention to reduce or eliminate the flow reversal in the ejector during the ebb of high energy flow therein. In general, this objective is attained by the addition of a duct to the gas exit end of the ejector in which decreasing pressure disturbances reflected into the duct by the emanation of surges of gas from the discharge end thereof arrive back at the ejector during the ebb of flow therein.

With reduction or elimination of flow reversals in the ejector, any transfer of momentum from the gas flow from exhaust ducts connected to cylinders with open exhaust valve to the relatively stagnant gas at the ends of ducts connected to closed exhaust valves by means of turbulent mixing in the region between the union of the ducts and the constriction of the ejector generally results in a loss of available energy which leads to a reduction in the effectiveness of the basic action. Several alternate means can be provided to reduce this momentum transfer. With the ejector designed for use with the additional duct, the intial surges of high energy flow into the common duct ahead of the ejector following the opening of exhaust valves cause severe temporary increases in pressure therein which significantly reduce the effectiveness of the basic action. A means can be provided for reducing the duration and intensity of these adverse pressure increases. With the significant reduction of flow reversal in the ejector, a large part of the available energy of the exhaust gas is dissipated by throttling at the opening around the exhaust valve. A special means can be provided to reduce this throttling loss and thus make available increased energy for use in the basic action.

The invention herein may be used with engines with five or more cylinders. However, for brevity, the description presented herein is limited to the use of the invention with an eight-cylinder engine.

The invention will be described with reference to the accompanying drawings in which:

Figure 1 is a diagrammatic view of the basic form of the invention with a diagrammatic, partial, sectional view of the engine to which it is attached;

Figure 2 presents a view of a modification of part of the configuration shown in Figure 1;

Figure 3 is a section on line 3—3 of Figure 2;

Figure 4 is an alternate arrangement of the configuration shown in Figure 1;

Figure 5 presents an isometric view of a modification of part of the configuration shown in Figure 4;

Figure 6 is a section on line 6—6 of Figure 5; and

Figure 7 presents an isometric of a special component usable in the configurations shown in Figures 1 and 4.

For a random firing order of the cylinders of the engine the invention would be of the general arrangement shown in Figure 1. In this figure, 1, 2, and 3 are representative cylinders of the engine to which the invention is attached. 4, 5, and 6 are the usual exhaust valves, and 7, 8, and 9 are the usual exhaust ports of these cylinders. Exhaust ducts, such as 10, 11, and 12, each connected to individual exhaust ports unite at a common region 13, in an effectively parallel direction, into a common duct. The cross-sectional area of the common duct contracts rapidly but smoothly at 14 to the constricted region 15 which is followed by a region of gradual increase in cross-section area 16. A duct 17 of a definite, special length and a preferred cross-section area is placed at the exit of 16. The end of this duct may open to the atmosphere or to the volume of a muffler 18.

In configuration, duct 17 constitutes an extension at substantially uniform cross-sectional area of the common duct at the exit of diffuser 16.

The symmetrical, planar arrangement of the ducts at 13, as shown in Figure 1, was chosen for clarity and is not essential to the operation of the device. Other arrangements such as the circular one shown in Figures 2 and 3 could be used instead. If the exhaust valves do not open simultaneously and are in close proximity, a single duct 19 may be connected to the several ports of these valves as shown at 20 in Figure 4.

When an exhaust valve, such as 4, opens, relatively high energy gas passes through the exhaust duct 10 and produces a high-velocity jet 21 in the region 14 moving in the direction shown. The edges of the jet are shown by dash-dot lines. A similar convention is used in the other figures that follow. For engines with five or more cylinders, one or more other exhaust valves is open for significant periods of time while the jet 21 passes through 14. For an eight-cylinder engine, such as shown in Figure 1, the flow in 14 is significantly affected by the flow from only one other cylinder, such as 3, during this period. The flow of gas from this cylinder produces the jet 22 in the region 14. However, since the opening of valve 6 preceded the opening of 4 by a considerable period of time, the velocity of jet 22 is considerably less than that of 21. The jets 21 and 22 move through the region 14 into the constricted region 15. In the region 14 some of the momentum of the jets is transferred to the relatively low energy gas on both sides of the jets by means of turbulent mixing. However, a major part of the momentum of the jets is maintained at 15.

In the region 15 part of the momentum of the high velocity jet 21 is transferred to the lower velocity jet 22 by means of turbulent mixing. Since the velocity of jet 22 at 15 is generally of the same order as that of jet 21, this transfer is relatively efficient. Because of this transfer of momentum the total available energy of most of the gas in jet 22 is greater in the region 16 than in the region 14. As the intermixed jets 21 and 22 move through the region of increasing cross-sectional area or diffuser 16, a large part of the velocity energy of the flow is converted to pressure energy at 23. As a result, the static pressure produced or maintained in the region 15 is considerably less than that at 23. Because of the reduced pressure at 15 the total rate of flow of gas from 14 and the various exhaust ducts, such as 10, 11, and 12, into 15 during this period is generally considerably greater than that through the common duct of the usual exhaust system during the same period. Momentum is transferred from the jet 21 to this additional flow as well as to the normal flow in the region 15 so that it also can move through the pressure rise at 16. This increased flow results in some reduction in the pressure in the region 14 and ducts 10, 11, and 12, compared to that in the corresponding parts of the usual exhaust system. The decrease in pressure in the duct 12 accelerates the flow therein sufficiently to remove more gas from the cylinder 3 during a given increment of time than is rejected with the usual exhaust system present, and during the latter part of the exhaust stroke of the piston the pressure in this cylinder is reduced to less than that usually present therein at the same time. The action in regions 15 and 16 is similar to that in the well known ejector.

As gas leaves the cylinder 1, the pressure therein gradually decreases, the energy and momentum of jet 21 gradually decreases and the amounts of gas induced through 15 against a given pressure rise from 15 to 23 also decreases. With a sufficient drop is the energy of jet 21 flow reversal occurs at 15. Such a flow reversal continues until another exhaust valve opens and additional high energy gas enters region 15. Without duct 17 present, severe flow reversal generally occurs during a considerable part of a cycle of operation of the invention. This flow reversal results in severe flow losses in the region 15 and increases pressures in region 14. This increase in pressure generally leads directly to some slight increase in pressure in the cylinders with open exhaust valves before these exhaust valves close. More importantly, it causes the pressures in the various ducts 11 connected to closed valves, reduced by the flow of high energy gas 21 through the ejector, to increase significantly toward the value present therein before the flow 21 occurred. A new high energy flow through 15 must again reduce the pressures in these ducts 11 while producing the desired decrease in the pressures in the cylinders with open exhaust valves. Each new flow therein must do the same. As a result, with the flow reversal at 15 a significant part of the available energy of the exhaust gases is dissipated in the basically useless action of repeatedly reducing the pressures in these ducts 11 as well as by the flow losses in 15 associated directly with the reversal.

With the duct 17 present a substantial part of the momentum of a surge of high energy gas is maintained as it moves beyond 23 into this duct. The surge moves down the duct at roughly the speed of sound therein and emerges at 24. The emanation of this surge of gas at 24 into the atmosphere or a substantial volume in the muffler reflects decreasing pressure disturbances into the duct which move toward 23 at roughly the speed of sound therein. For the most effective reflection of such disturbances the resistance of the gas flow from the duct 17 to the volume of the muffler 18 should be relatively low. The length of the duct 17 is such that these disturbances arrive at 23 during the following ebb of flow of high energy gas from 15. The resulting reduced pressure at 23 lessens the pressure increase from 15 to 23. As a result, the reduced flow energy can maintain a forward flow through 15 across more or all of the cross section of this region. The duration of the reduced pressure at 21 is generally sufficient so that the reversal of flow is reduced until another exhaust valve opens to provide a new surge of high energy gas in the region 15.

The ebb of flow of high energy gas from 15 of course leads to an ebb of the flow through 17. The emanation of this flow ebb from 24 reflects increasing pressure disturbances into the duct 17. With the duct length as defined above, these disturbances arrive at 23 during the following surge of high energy gas from 15. The resulting increased pressure at 23 retards the flow through 15 and thus reduces the effectiveness of the basic action of the device. However, this adverse effect of duct 17 is small compared to the favorable effect described above. The surge of high energy gas generally prevents these increased pressures at 23 from causing flow reversal at 15.

The action of this duct 17 may have some direct effects on the pressures in the cylinders with open exhaust ports. However, because of the flow through 15 and the large volume of the ducts 10, 11, and 12, such effects are very small. Such effects have no special relationship to the movement of the pistons in these cylinders. They may result in an increase or decrease of the pressures therein at the most critical time near the end of the exhaust stroke.

The optimum length of duct 17 in feet for a given engine speed is equal roughly to the average speed of sound in the duct in feet per second divided by twice the product of the speed of the engine in revolutions per second and the number of cylinders. For an eight-cylinder automotive engine operating at moderate engine speeds this length is about four feet. For mufflers wherein the gas moves from the duct 17 to the volume of the muffler through a series of openings along the part of 17 in the muffler this length is to the mean point of such openings. With an increase or decrease of the engine speed from the design value the period of decreased pressure at 21 produced by the duct 17 occurs too late or early, respectively. This allows an increased amount of flow reversal at 15 for these off-design conditions.

The magnitudes of the alternate favorable pressure reductions and unfavorable pressure increases at 23 produced by the presence of duct 17 are both increased by decreasing the cross-sectional area of duct 17. Thus, the most satisfactory duct area must be a compromise. For the highest overall effectiveness of the invention the compromise duct area should be such that the fluctuations in pressure at 15 are reduced to a minimum. Experiments have indicated that for most satisfactory operation of the invention, the area of duct 17 should be roughly one and a quarter to two times the area of the exits of the exhaust ducts at 13 from which a substantial amount of flow emanates simultaneously during a significant period. In the case of the eight cylinder engine of Figure 1, such flow emanates from two such duct exits such as 10 and 12.

After a very short period following the initial functioning of the device, the operation reaches an equilibrium condition for a constant engine condition. With little or no flow reversal in the region 15, because of the action of duct 17, the pressure in the exhaust ducts connected to closed exhaust valves such as 11 remain at a considerably reduced pressure of a roughly constant value. Little gas flows from these ducts connected to closed exhaust valves, and jets, such as 21 and 22, essentially fill the region 15. With such a condition any momentum or energy transferred from the jets 21 and 22 to the essentially stagnant gas 25 at the ends of the ducts 11 in the region 14 by turbulent mixing is almost completely wasted. At off-design conditions, when some flow reversal may occur in the region 15 and some gas must be removed from ducts connected to closed exhaust ports during each cycle of operation, a transfer of momentum to the gases at the ends of these ducts in the region 14 starts the required energization of the gases which are removed through 15. However, since the initial velocity of these gases in this region 14 is relatively low compared to that of the jets, the action in this region is relatively inefficient compared to that in the region 15. In either case the effectiveness of the device is adversely affected by the turbulent mixing of the jets with still gas in the region 14.

The undesired mixing of jets, such as 21 and 22, with the essentially stagnant gas 25 in the region 14 can generally be diminished by arranging the system such that the average area of contact of the jets with the stagnant gas during a complete cycle of operation is reduced. With the side-by-side arrangements of the exhaust ducts 10, 11, and 12 at 13, as shown in Figures 1 and 2, the average area of contact of the jets with the stagnant gas in the region 14 is generally much less than the contact area obtained with ducts united in concentric, in line, or stepped arrangements as has previously been proposed for several systems for reducing engine exhaust pressures through the action of an ejector. (For example, French Patent No. 833,256.) The circular arrangement of the exhaust ducts 10, 11, and 12 at 13 shown in Figure 2 provides less area of contact of the jets with stagnant gas in the region 14 than that with the planar arrangement of Figure 1.

The average area of contact of jets, such as 21 and 22, with the stagnant gas 25 in the region 14 can be further reduced by connecting certain of the exhaust ducts 10, 11 and 12 to the common duct at 13 in the same sequence as the firing order of the corresponding engine cylinders. With such an arrangement, certain of the exhaust gas jets in the region 14 are in mutual contact rather than in contact with stagnant gas. Such a means is preferably used with configurations wherein a number of exhaust ducts, 10, 11, and 12, are connected to a single common region 14, such as illustrated in Figures 1 and 3. The minimum area of contact of the jets with stagnant gas for the configurations shown in Figures 1 and 2 would be obtained by connecting all the ducts at 13 in the same sequence as the firing order of the corresponding engine cylinders as illustrated in Figure 2. With the circular arrangement of the ducts shown in Figures 2 and 3 the momentum transfer in the region 14 is further reduced by slanting the ends of the walls of the ducts with respect to the normals of the axes of the ducts as shown at 13′ in Figure 2.

The area of contact of the jets, such as 21 and 22, with essentially stagnant gas in the region 14 is also reduced by dividing this region into two or more parts as shown in Figure 4. To eliminate interference between gas flows from cylinders with open exhaust valves, such as 21 and 22, the ducts uniting in a given division are connected to cylinders for which the valve openings do not materially overlap. With such a division of region 14 some of the contacts of jets, such as 21 and 22, with relatively stagnant gas 25 are eliminated, being replaced by contacts with the walls of the dividing element as shown in Figure 4.

The undesirable momentum transfer from the jets to the stagnant gas 25 in the region 14 is also reduced by curving the streamwise central axis $x$—$x$ of this region, or a part thereof, about one or more axes, such as axis $y$—$y$, which are essentially parallel with the line $z$—$z$ bisecting the exits of the exhaust ducts such as 10 and 11 at the common duct, as shown in Figure 5. This means is preferably used with configurations in which relatively small numbers of ducts unite in separate divisions of region 14, such as shown in Figure 2. Such a preferred application is illustrated in Figure 5. A flow of gas 21 from an open exhaust valve emanates from duct 10, while relatively stagnant gas 25 is present near the end of the duct 11 connected to a closed exhaust valve. Because of centrifugal forces the high velocity jet 21 shifts toward the outer wall 26 as it moves into the region 14 so that at 27 it is concentrated near this wall while relatively stagnant gas 25 is present near wall 28 as shown in Figure 6. From 27 to 15 the jet 21 flows around the stagnant gas 25. The envelope of the area of contact between jet 21 and the stagnant gas 25 is indicated by the dash-dot line. Experiments have demonstrated that when a jet flows in such a manner the mixing of the jet with stagnant gas is considerably reduced. When a jet emanates from 11 and the gas in 12 is relatively stagnant a similar action occurs. The movement of the jet flow toward the outer wall 26 is accentuated by slanting the end of the wall between the ducts 10 and 11 with respect to a normal to the duct axes as shown at 29 in Figure 5.

With the significant reduction of flow reversal in ejector 15 and 16 the cross-sectional area of 15 is made relatively small for the most effective operation of the system. This reduced area retards the initial flow of a high energy jet, such as jet 21, from region 14 and the pressure therein increases significantly. This increase in pressure leads to flow reversals in region 14 which have the same adverse effects on the operation of the basic action of the system as the flow reversals in 15 previously described. As the initial surge of jet 21 passes through the diffuser 16, decreasing pressure disturbances are reflected into region 15. These arrive at 14 a short time later causing a large reduction or elimination of the increase in pressure just described. The time required for these decreasing pressure disturbances to arrive at 14 and thus the duration and overall adverse effect of the increase in pressure therein is decreased by decreasing the length of 15. To allow a decrease in the length 15 and yet provide substantially the same degree of momentum transfer from jet 21 to 22 in this region, the action of the present invention is further improved by addition of a means for increasing the rate of transfer in 15 placed along the length of 15 or at the entrance to the region at 30.

To provide the most effective and efficient increase in the rate of transfer of momentum in 15, this means should move part of the mass of the jets into the general regions occupied by other jets in substantial, discrete segments. Such a movement may be accomplished by many different means. For the planar arrangements of the ducts shown in Figure 1 or 4, the desired intermixing of the jets might be accomplished with vaned means 31 shown in Figure 7. For the arrangement shown in Figure 4, such a means could be made part of the end of the duct walls at 32. A basically similar means might be used for the circular arrangement of the ducts shown in Figures 2 and 3. The vanes 33 of member 31 divert segments of the jet 21 into the region 34 while the vanes 35 divert segments of the jet 22 into the region 36. Because of this action at a station downstream of this means 31, such as at 37, the jets 21 and 22 are interfolded, the surface of contact of these jets is greatly increased, and the momentum transfer between them is thus increased.

With the reduced pressure maintained in the ducts 11 connected to closed valves, because of the action of duct 17, a significant part of the available energy of the initial flow of exhaust gas from a newly opened exhaust port is used in the very inefficient process of raising the pressure in this duct to that in the cylinder. This process is inefficient because much of the energy is dissipated by throttling at the exhaust valve as the gas moves from a region of relatively high pressure to one of relatively low pressure. To provide a reduction in the throttling losses of the gas flow from the cylinders around the exhaust valves, such as 4, and thus make available increased energy for the basic action of the system, the ducts are constricted along all or most of their length, as shown at 38 in Figure 1 or 4. With such an extended constriction, the duct volume between the valve and the flow retarding constriction is greatly reduced or eliminated. As a result, the time required for the flow from the cylinder to provide a given increase in pressure in this volume is greatly reduced, and the energy dissipated by throttling at the valve while the pressure increases in this volume is substantially reduced. For the most satisfactory performance of the invention it is preferred that the cross-sectional area of this extended constricted region of the ducts be less than the area of the exhaust ports such as 7, 8, and 9.

In summary, the invention consists of an exhaust system for multi-cylinder, four-cycle, internal combustion engines comprising individual exhaust ducts from each of the exhaust ports of the cylinders, or from ports of cylinders with exhaust valves in close proximity and not open simultaneously, united at a common region in an essentially parallel direction with a common duct which contracts rapidly but smoothly in cross-sectional area beyond the region of union into an ejector consisting of a relatively short constricted region followed by a gradually expanding region and a duct connected to the exit of said ejector constituting an extension thereof at substantially uniform cross-sectional area and with a length such that decreasing pressure disturbances reflected into the duct by the emanation of surges of gas from the discharge end thereof arrive back at the ejector during the ebb of flow therein in order to materially reduce, if not eliminate altogether, the flow reversal in the ejector during the ebb of flow. The action of the duct at the exit of the ejector can be augmented by means for reducing the momentum transfer between the flow from cylinders with open exhaust valves and the relatively stagnant gas at the ends of ducts connected to closed exhaust valves in the contracting region of the common duct; one such means being a reduction in the average area of contact of the jets with the stagnant gas; another such means being a curvature of the streamwise axis of the contracting region of the common duct, or a division thereof, the axes of curvature being essentially parallel with the line bisecting the exits of the ducts from the exhaust ports at the common duct, or division thereof. The effectiveness of the system may be further improved by a means for increasing the rate of momentum transfer between jets of diverse energies in the constricted region of the ejector, thereby allowing a desirable shortening of this region while still achieving a given transfer of momentum therein. To reduce the throttling losses at the exhaust valves and thus make available increased energy for the basic action of the system, the various exhaust ducts from the exhaust ports are constricted to an area less than that of the exhaust ports along all or most of the lengths of these ducts, the constrictions originating at the discharge ends of these ducts, i. e. at the connections with the common duct.

I claim:

1. In an exhaust system for multi-cylinder, four cycle internal combustion engines, the combination comprising exhaust ducts extending from the exhaust ports of the cylinders, a common duct uniting said exhaust ducts in an essentially parallel direction to establish a common region of union, said exhaust ducts being arranged in a substantially circular array at the union with said common duct, said common duct being progressively contracted in the direction of flow of the exhaust gases therethrough, an ejector connected to the gas exit end of said common duct, said ejector being comprised of a constricted region followed by a gradually expanding region, and a duct extension of substantially uniform cross sectional area connected to the gas exit end of said ejector and being of a length such that decreasing pressure disturbances reflected into said duct extension by the emanation of gas surges from the discharge end thereof are reflected back to said ejector during ebb of gas flow therein thereby to materially reduce gas flow reversal in said ejector during said ebb of gas flow.

2. An exhaust system for internal combustion engines as defined in claim 1 wherein the order of the relative positions of said exhaust ducts at the union with said common duct is the same as the order of firing of the corresponding engine cylinders.

3. An exhaust system for internal combustion engines as defined in claim 1 wherein for a given engine speed the length of said duct extension is substantially equal to the speed of sound therein in feet per second divided by twice the product of said given engine speed in revolutions per second and the number of cylinders.

References Cited in the file of this patent

FOREIGN PATENTS

| | | |
|---|---|---|
| 319,426 | Great Britain | Sept. 26, 1929 |
| 622,824 | France | Mar. 7, 1927 |
| 678,119 | France | Dec. 23, 1929 |